United States Patent
Keber

(10) Patent No.: US 7,177,763 B2
(45) Date of Patent: Feb. 13, 2007

(54) METHOD AND DEVICE FOR PREVENTING UNPERMITTED APPROACH OF AIRPLANES TO OBJECTS ON THE GROUND WHICH ARE TO BE PROTECTED

(76) Inventor: Werner Keber, Zum Traroth 11, Bad Soden-Salmuenster (DE) 63628

( * ) Notice: Subject to any disclaimer, the term of this patent is extended or adjusted under 35 U.S.C. 154(b) by 0 days.

(21) Appl. No.: 10/490,676

(22) PCT Filed: Sep. 23, 2002

(86) PCT No.: PCT/EP02/10663

§ 371 (c)(1),
(2), (4) Date: Mar. 24, 2004

(87) PCT Pub. No.: WO03/030125

PCT Pub. Date: Apr. 10, 2003

(65) Prior Publication Data

US 2004/0267413 A1 Dec. 30, 2004

(30) Foreign Application Priority Data

Sep. 25, 2001 (DE) .................... 101 47 237

(51) Int. Cl.
*G08B 29/00* (2006.01)
*G08G 7/00* (2006.01)

(52) U.S. Cl. .................. 701/301; 701/13; 340/961

(58) Field of Classification Search .............. 701/9, 701/14, 13, 301, 300, 4, 207, 225; 340/961, 340/970, 979, 973, 963; 244/17.13, 158 R; 342/357.01, 29, 65, 455
See application file for complete search history.

(56) References Cited

U.S. PATENT DOCUMENTS

| | | | | |
|---|---|---|---|---|
| 4,646,244 A * | 2/1987 | Bateman et al. | ............. | 701/301 |
| 4,675,823 A * | 6/1987 | Noland | ................. | 701/300 |
| 5,872,526 A * | 2/1999 | Tognazzini | ................. | 340/961 |
| 5,884,222 A * | 3/1999 | Denoize et al. | ............. | 701/301 |
| 6,076,042 A | 6/2000 | Tognazzini | | |
| 6,092,008 A * | 7/2000 | Bateman | ................. | 701/14 |
| 6,161,063 A | 12/2000 | Deker | | |
| 6,452,511 B1* | 9/2002 | Kelly et al. | ................ | 340/970 |
| 6,480,120 B1* | 11/2002 | Meunier | .................... | 340/970 |
| 2003/0055540 A1* | 3/2003 | Hansen | ......................... | 701/3 |

\* cited by examiner

*Primary Examiner*—Dalena Tran
(74) *Attorney, Agent, or Firm*—Jordan and Hamburg LLP

(57) ABSTRACT

The invention concerns a method for preventing airplanes from impermissibly approaching defendable ground objects, the method suggests that a defendable ground object is assigned a virtual prohibited zone spatially surrounding it, with the outer boundary of such zone being provided with a sufficient horizontal minimum distance from the ground object and a vertical minimum distance determining a given minimum crossing altitude, that the prohibited zone is assigned a virtual correction zone laterally surrounding it whose outer boundary has a horizontal minimum distance from the outer boundary of the prohibited zone in any case sufficient for any forced deviation corrections and an altitude equal to that of the prohibited zone; that the correction zone is assigned a virtual alarm zone spatially surrounding it whose outer boundary has a horizontal minimum distance from the outer boundary of the correction zone in any case sufficient for manual deviation corrections; that the geographical data of the outer boundaries of at least the alarm and the correction zone are recorded and digitally stored together with the vertical minimum distance or the minimum crossing altitude and stored with access protection provided in every airplane and displayed in the cockpit.

13 Claims, 3 Drawing Sheets

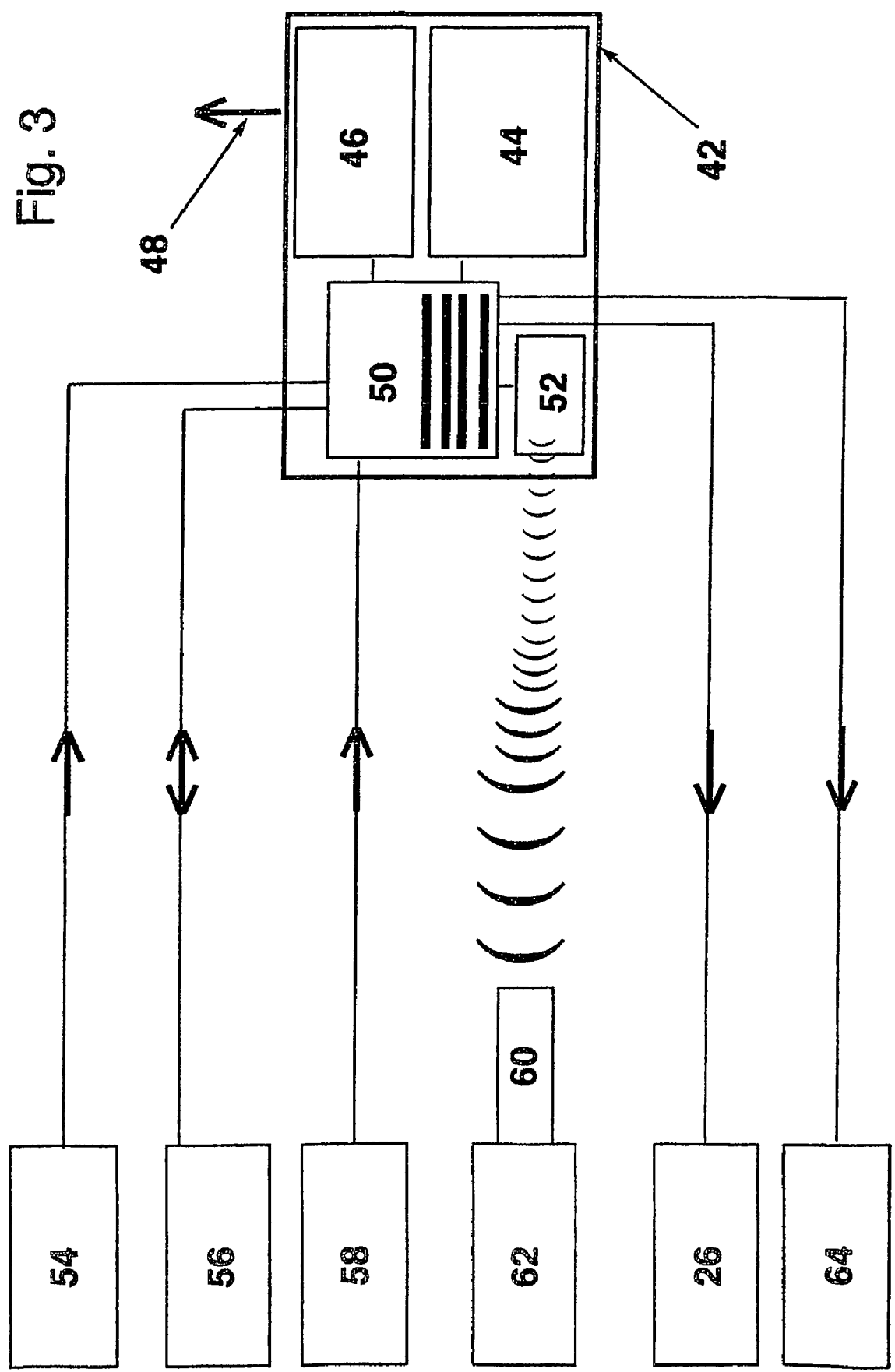

METHOD AND DEVICE FOR PREVENTING UNPERMITTED APPROACH OF AIRPLANES TO OBJECTS ON THE GROUND WHICH ARE TO BE PROTECTED

The invention relates to a method for preventing airplanes from impermissibly approaching defendable ground objects, with the momentary flight position being recorded in a satellite-based way and used for the purposes of performing manual and automatic flight corrections. Furthermore, the invention relates to a facility for applying such method by means of a satellite-based navigational system receiver, a computer equipped with a memory, an autopilot system for airplanes, an anticollision system for airplanes, an altimeter provided with a display as well as signaling means in the cockpit of the airplane.

In view of the continuously rising danger of terrorist attacks there is a growing need to protect highly important and endangered ground objects such as nuclear power stations and industrial facilities against colliding airplanes. Certainly, many safety provisions exist in order to prevent such collisions even under unfavorable conditions. However, this requires the crew to strictly adhere to such safety provisions, which is not the case in the event of terrorist targets.

The present invention is therefore based on the task of creating a method and a facility allowing defendable ground objects to be reliably protected from being impermissibly approached by airplanes by relatively simple means, independent of whether such flight approach is effected inadvertently or purposefully.

According to the invention, a method of the nature described in the heading of Claim No. 1 designed to solve the aforesaid task is characterized by the features listed in the identification of this claim, i.e.

- a defendable ground object is assigned a virtual prohibited zone spatially surrounding such object, with the outer boundary of such zone providing for a sufficient horizontal minimum distance and a vertical minimum distance determining a given minimum crossing altitude from the ground object;
- the prohibited zone is assigned a virtual correction zone laterally surrounding it, the outer boundary of which provides for a horizontal minimum distance from the outer boundary of the prohibited zone in any case sufficient for forced deviation corrections, and the altitude of which is equal to that of the prohibited zone;
- the correction zone is assigned a virtual alarm zone spatially surrounding it, the outer boundary of which provides for both a horizontal and vertical minimum distance from the outer boundary of the correction zone in any case sufficient for manual deviation corrections;
- the geographical data of the outer boundary of at least the alarm and the correction zone are recorded and digitally stored together with the vertical minimum distance or the minimum crossing altitude and stored in every airplane with access-protection provided and displayed in the cockpit;
- the momentary flight position is continuously recorded in a satellite-based way and the momentary flight altitude established and such instantaneous data are compared with the geographical data of the outer boundaries of the alarm and the correction zone;
- in the event of an airplane's penetration into the alarm zone detected by a position comparison of the aforesaid nature, a warning signal is transmitted until the airplane leaves the alarm zone, and the airplane is at the same time allowed to be steered manually in order to make it leave the alarm zone;
- in the event of an airplane's lateral penetration into the correction zone detected by a position comparison of the aforesaid nature, the airplane's manual steerability is, at least until the airplane enters the alarm zone again, be temporarily blocked and replaced by an autopilot control action to the right or left forcing the airplane to leave the correction zone;
- in the event of an approach to the vertical minimum distance determining the given minimum crossing altitude performed in descent above the prohibited zone and the correction zone, a descent limitation for the airplane to at minimum the minimum crossing altitude is forced, Such a method is decidedly safe and reliably prevents an airplane from entering the prohibited zone. Whenever an airplane enters the alarm zone by mistake, the crew receives a corresponding signal enabling it to manually steer the airplane out of the alarm zone. In case this should be impossible or purposefully prevented and the airplane should enter the correction zone, the airplane's manual steerability will be inhibited with autopilot control being activated simultaneously until the airplane has left the correction zone.

This makes it impossible, for example in the case of terrorist attacks, to approach a ground object purposefully.

The development of Claim No. 2 ought to be sufficient for the majority of safety purposes and is characterized by a particularly simple zone geometry. However, it is in principle possible to chose another zone geometry if this should be favorable considering the ground object to be protected in the case at issue as well as the existing external conditions.

By means of giving priority to anticollision control, the development of Claim No. 3 prevents any collisions with other airplanes from occurring in the case of compulsory autopilot control action in the correction zone.

According to Claim No. 4, a vector-oriented control program for the autopilot control system has proven particularly functional and simple in practice.

The development according to Claim No. 5 favors an always obtuse-angled flight correction by the autopilot control system, in order to achieve the most simple and safe avoidance maneuvers.

According to Claim No. 6, anticollision control should even be superordinate to any descent limitation above the prohibited zone and the correction zone in order to prevent collisions.

Claim No. 7 furthermore favors the enforcement of a given safety altitude by the autopilot control system within the correction zone in order to prevent collisions with, for example, mountains and other obstacles.

According to the invention, a facility appropriate to apply the invented method for solving the aforesaid task of the nature described in the heading of Claim No. 8 is characterized by the features listed in the identification of this claim, i.e.

- the geographical data of the outer boundaries of the alarm zone and the correction zone surrounding a central prohibited zone, a vertical minimum distance determining an object-related minimum crossing altitude as well as an environment-related safety altitude are stored in the computer memory as safety variables;
- the computer continuously compares the data from the navigational system receiver and the altimeter with the safety variables stored and, depending on the occurrence of particular comparison results, starts the transmission of a warning signal and/or compulsory control by the autopilot system with subordinate priority of the anticollision system;

the display means in the cockpit are designed for optically displaying the stored safety variables and the relative momentary airplane position as well as any comparative values resulting from this;

the computer including its memory as well as the navigational system receiver are arranged in a control box provided with access protection.

Such a facility is decidedly safe and relatively simple and, owing to the access-protected arrangement of the control box in the airplane, cannot be manipulated without authorization. This makes it impossible for example for terrorists to impermissibly approach any protected ground objects after overwhelming the airplane's crew.

The preferential development of the facility according to Claim No, 9 even increases safety by the fact that in the event of any unauthorized intervention in the control box, an alarm is triggered or even an airplane's take-off prevented.

The other measures provided for in Claim No. 10 make sure that the control box cannot be put out off operation by interrupting the external power supplies and that a radio set is activated in the case of any unauthorized intervention.

The invention is explained in more detail below using illustrated examples.

FIG. 2 shows an elementary diagram of a graphical cockpit display from which the relative position relations of an airplane to a defendable ground object may be gathered, whereas FIG. 3 shows a simplified block diagram of a facility intended to protect a ground object against airplanes impermissibly approaching it.

Figure 1:
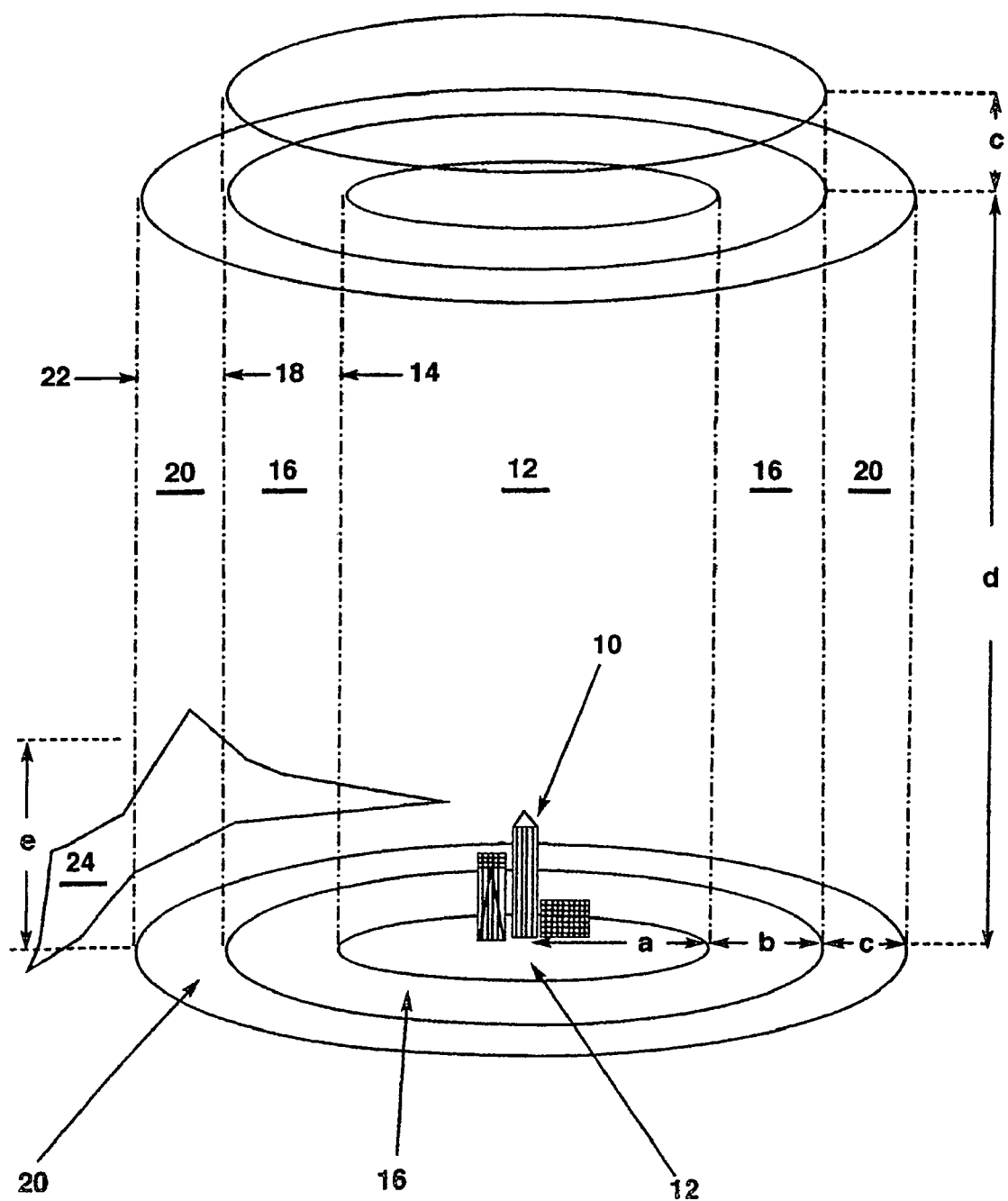
FIG. 1 shows an elementary diagram of a defendable ground object surrounded by several virtual zones of a particular altitude.

According to FIG. 1, a virtual prohibited zone 12 extends around a defendable ground object 10 such as a nuclear power station, which zone has a circular section with a radius or horizontal minimum distance a and an altitude d equal to a given vertical minimum distance or a minimum crossing altitude in the case at issue. In order not to endanger the ground object 10, no airplane is allowed to enter the prohibited zone 12, i.e. penetrate into its outer boundary 14 from above or from the side.

The prohibited zone 12 is surrounded by a ring-shaped, virtual correction zone 16 concentric to it, which in the case at issue also has a circular section, the same altitude d as the prohibited zone 12 and an outer boundary 18. The distance between the outer boundaries 18 and 14 of the correction zone 16 and the prohibited zone 12 is equal to a horizontal minimum distance b necessary to allow an airplane penetrating into the correction zone 16 inadvertently or by intent to be safely turned round to the outside by autopilot or forced control even in unfavorable flight situations without penetrating into the prohibited zone 12.

The correction zone 16 is surrounded by a ring-shaped, virtual alarm zone 20 concentric to it, which in the case at issue also has a circular section, the same altitude d as the prohibited zone 12 as well as the correction zone 16 and an outer boundary 22, The distance between the outer boundaries 22 and 18 of the alarm zone 20 and the correction zone 16 is equal to a horizontal minimum distance c required to allow an airplane penetrating into the alarm zone 20 to be steered away from it to the outside by the airplane's crew without penetrating into the correction zone 16.

In the example at issue, a circular area is adjoining above the prohibited zone and the correction zone. The size of the vertical minimum distance c of this area may be equal to the horizontal minimum distance c of the alarm zone 20. In the event of a descent in this area, such descent will be limited to at minimum the minimum crossing altitude d by the autopilot system or by force.

The geographical conditions such as mountains 24 furthermore require a particular minimum or safety altitude e, which in the correction zone 16 is forced by an autopilot-controlled climb in the respective situations.

Figure 2:
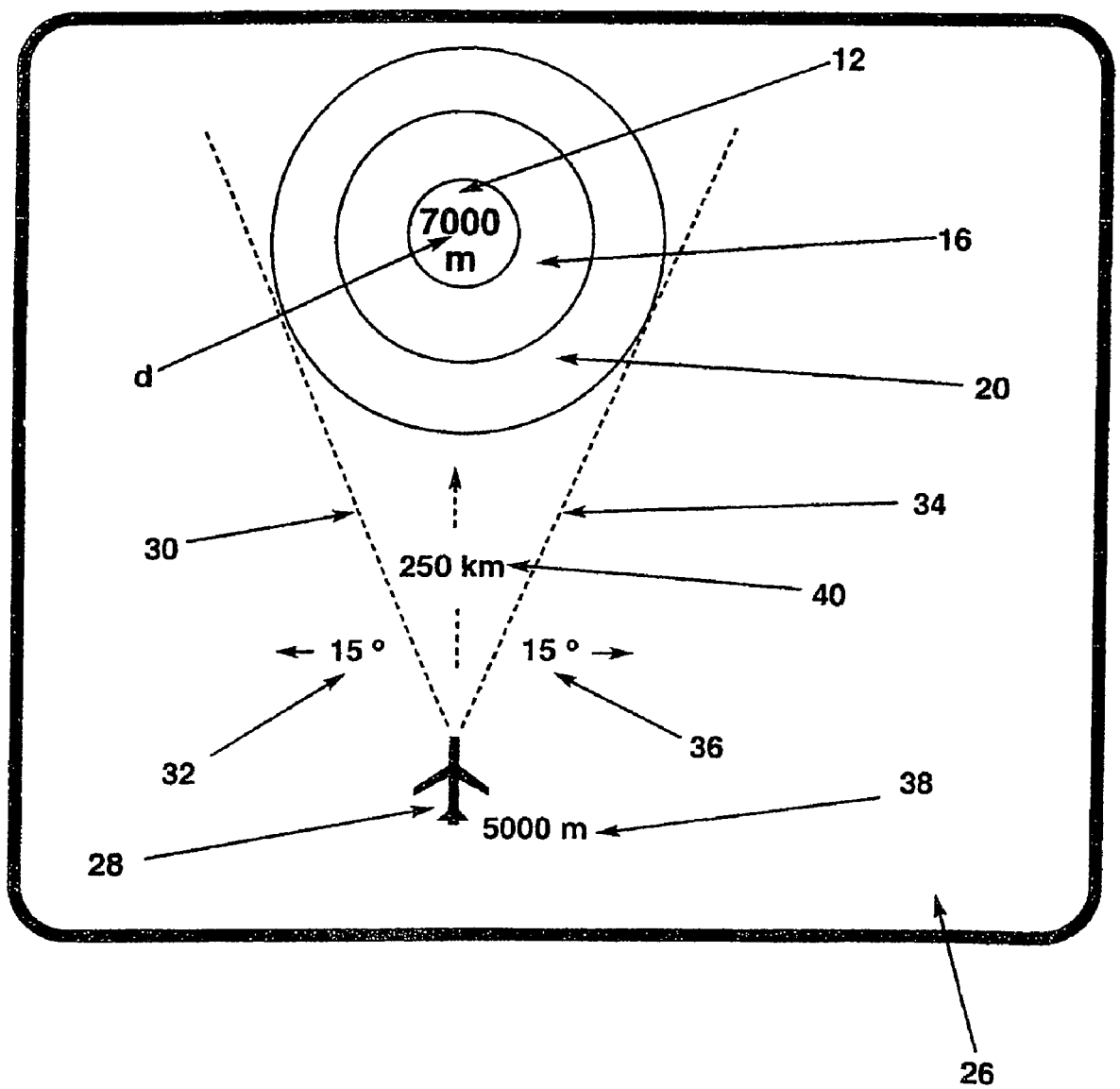

According to FIG. 2, the cockpit is equipped with a graphical display 26, from which the relative position relations between the illustrated airplane 28 and the illustrated virtual prohibited, correction and alarm zones 12, 16, 20 may be gathered, A left avoidance beam 30 being tangent to the alarm zone 20 with an associated left avoidance angle 32 and a right avoidance beam 34 being tangent to the alarm zone 20 with an associated right avoidance angle 36 result from the display. The avoidance angles 32, 36 indicate the lateral flight deviation angles at minimum required in view of the momentary direction of the flight to make the airplane 28 pass the alarm zone 20. In addition to the aforesaid, the display shows the momentary flight altitude 38, which is 5,000 m in this example, and the momentary object distance 40 from the defendable ground object 10, which is 250 km in this example. The minimum crossing altitude d set for the defendable ground object 10 is additionally shown.

Consequently, the airplane's crew is able to laterally circumnavigate the virtual alarm zone 20 purposefully. In case the airplane 28 should nevertheless enter the alarm zone 20, which event would trigger the transmission of a warning signal, the crew can still purposefully turn the airplane 28 out of this zone to the outside. However, if the airplane enters the correction zone 16 inadvertently or purposefully, the autopilot will take over the steering of the airplane and by force steer the airplane laterally away from the correction zone 16 to the alarm zone 20. Only there, the crew may take over control of the airplane again. If the airplane is above the prohibited zone 12 and the correction zone 16 and the vertical minimum distance d determining the given minimum crossing altitude is approached in descent, the autopilot system forces the airplane's descent to be limited to at minimum the minimum crossing altitude.

According to FIG. 3, every airplane equipped this way will be provided with an access-protected control box 42. This box contains a microcomputer or computer 44 equipped with a memory and a vector-oriented control program, a satellite-based GPS or navigational system receiver 46 with an antenna 48, a computer interface 50 for connecting devices as well as a safety device 52 equipped with an independent power supply including a radio set. In addition to the already mentioned graphical display 26, the cockpit of the airplane includes a TCAS or anticollision system 54, an autopilot system 56, an altimeter 58 as well as a both optical and acoustical alarm element 64 responding in the alarm zone 20. All these devices are connected to the computer interface 50. The safety device 52 of the control box 42 responds in the case of unauthorized intervention as well as in the event that any outer or inner lines of the control box 42 should be cut. This activates the radio set which in turn for example triggers a radio receiver 60 in the cockpit with an optical alarm element 62. In addition to the above, a non-illustrated function inhibition may be activated in order to prevent an airplane from taking off in the event that the safety device 52 responds.

The fixed geographical data of the outer boundaries 18 and 22 of the alarm zone 20 and the correction zone 16 as well as the vertical minimum distance d determining the object-related minimum crossing altitude and the environment-related safety altitude e and, if appropriate, further data, are stored in the memory of the computer 44 of the control box 42 as safety variables, These values are continuously compared with the data from the navigational system receiver 46 and the altimeter 58. Subject to the occurrence of particular comparison results, the transmission of an alarm signal and/or forced control by the autopilot system 56 with superordinate priority of the anticollision system 54 are/is triggered.

Once all endangered and defendable ground objects 10 have this way been taken into account by appropriately storing their geographical data, no airplane can penetrate into the prohibited zone 12 because the airplane's steerability will before be taken away from the pilot by force. This will lead to a drastic increase of safety in particular in the event of terrorist attacks.

The invention claimed is:

1. Method for preventing airplanes from impermissibly approaching
    defendable ground objects, with the momentary flight position being recorded in a satellite-based way and used for manual and automatic flight corrections,
    comprising the following features:
    a defendable ground object is assigned a virtual prohibited zone spatially surrounding it, the outer boundary of which has a sufficient horizontal minimum distance from the ground object and a vertical minimum distance determining a given minimum crossing altitude;
    the prohibited zone is assigned a virtual correction zone laterally surrounding it, the outer boundary of which has a horizontal minimum distance from the outer boundary of the prohibited zone in any case sufficient for distance deviation corrections and an altitude equal to that of the prohibited zone;
    the correction zone is assigned a virtual alarm zone spatially surrounding it, the outer boundary of which has a horizontal minimum distance from the outer boundary of the correction zone in any case sufficient for manual deviation corrections;
    the geographical data of the outer boundaries of at least the alarm and the correction zone are recorded and, together with the vertical minimum distance or the minimum crossing altitude, digitally stored and kept in every airplane with access protection provided as well as displayed in the cockpit;
    the momentary flight position is continuously recorded in a satellite-based way and the momentary flight altitude established and such instantaneous data are compared with the geographical data of the outer boundaries of the alarm zone and the correction zone;
    in the event of an airplane's penetration into the alarm zone detected upon comparison of the aforesaid position data, a warning signal is transmitted until the airplane's withdrawal from the alarm zone, and the airplane is at the same time allowed to be steered manually for the purposes of leaving the alarm zone;
    in the event of an airplane's lateral penetration into the correction zone detected upon comparison of the aforesaid position data, the airplane's manual steerability is temporarily inhibited and replaced by autopilot control to the right or left forcing withdrawal from the correction zone at least until the airplane reaches the alarm zone again; and
    in the event that the vertical minimum distance determining the given minimum crossing altitude is approached in descent above the prohibited zone and the correction zone, a descent limitation to at minimum the minimum crossing altitude is forced; and
    wherein the prohibited, correction and alarm zones each being defined by a predetermined radii.

2. Method in accordance with claim No. 1, wherein circular prohibited, correction and alarm zones are used in the horizontal section.

3. Method in accordance with claim No. 1 or 2, wherein autopilot control within the correction zone is performed in connection with superordinate anticollision control.

4. Method in accordance with claim 1 or 2, wherein autopilot control is triggered by a vector-oriented control program.

5. Method in accordance with claim 1 or 2, wherein autopilot control is subject to the angle of approach to the correction zone, always performed in an obtuse angle to the right or left.

6. Method in accordance with claim 1 or 2, wherein the limitation of the airplane's descent above the prohibited zone and the correction zone is effected in connection with superordinate anticollision control.

7. Method in accordance with claim 1 or 2, whereinupon penetration into the correction zone and in case the airplane is below a given safety altitude, for example a safety altitude determined by geographic conditions such as mountains, the autopilot control forces an optimal climb until the safety altitude is reached.

8. A facility for applying the method in accordance with claim 1 or 2, with a satellite-based navigational system receiver, a computer provided with a memory, an autopilot system for airplanes, an anticollision system for airplanes, an altimeter and display and signaling means in the airplane's cockpit,
    wherein:
    the geographical data of the outer boundaries of an alarm zone and a correction zone surrounding a central prohibited zone, a vertical minimum distance determining an object-related minimum crossing altitude and an environment-related safety altitude are stored in the memory of the computer as safety variables;
    the computer continuously compares the data from the navigational system receiver and the altimeter with the stored safety variables and subject to this triggers the transmission of a warning signal and/or forced autopilot control with superordinate priority of the anticollision system upon occurrence of particular comparison results;
    the display means in the cockpit are designed to display the stored safety variables and the relative momentary position of the airplane as well as any resulting comparative values; and
    the computer with its memory and the navigational system receiver are arranged in an access-protected control box.

9. A facility in accordance with claim 8, wherein the control box is equipped with a safety device responding in the case of any unauthorized intervention and designed to trigger a warning signal clement in the cockpit, and/or with a function inhibition for take-off.

10. A facility in accordance with claim 9, characterized by the fact that the safety device of the control box is equipped with an independent power supply in the control box and a radio set responding in the event of any unauthorized intervention and triggering the safety function.

11. A method for preventing airplanes from impermissibly approaching defendable ground objects, with the momentary flight position being recorded in a satellite-based way and used for manual and automatic flight corrections, comprising the following features:
- a defendable pound object is assigned a virtual prohibited zone spatially surrounding it, the outer boundary of which has a sufficient horizontal minimum distance from the ground object and a vertical minimum distance determining a given minimum crossing altitude;
- the prohibited zone is assigned a virtual correction zone laterally surrounding it, the outer boundary of which has a horizontal minimum distance from the outer boundary of the prohibited zone in any ease sufficient for forced deviation corrections and an altitude equal to that of the prohibited zone;
- the correction zone is assigned a virtual alarm zone spatially surrounding it, the outer boundary of which has a horizontal minimum distance from the outer boundary of the correction zone in any case sufficient for manual deviation corrections;
- the geographical data of the outer boundaries of at least the alarm and the correction zone are recorded and, together with the vertical minimum distance or the minimum crossing altitude, digitally stored and kept in every airplane with access protection provided as well as displayed in the cockpit;
- the momentary flight position is continuously recorded in a satellite-based way and the momentary flight altitude established and such instantaneous data are compared with the geographical data of the outer boundaries of the alarm zone and the correction zone;
- in the event of an airplane's penetration into the alarm zone detected upon comparison of the aforesaid position data, a warning signal is transmitted until the airplane's withdrawal from the alarm zone, and the airplane is at the same time allowed to be steered manually for the purposes of leaving the alarm zone;
- automatically replacing manual steerability of an airplane with autopilot control if comparison of said position data indicates that said airplane laterally penetrates said correction zone, said autopilot steering said airplane to the right or left for forcing withdrawal from said correction zone, and automatically restoring manual steerability of said airplane when said airplane reaches the alarm zone; and
- in the event that the vertical minimum distance determining the given minimum crossing altitude is approached in descent above the prohibited zone and the correction zone, a descent limitation to at minimum the minimum crossing altitude is forced; and
- wherein the prohibited, correction and alarm zones each being defined by a respective predetermined radius.

12. The method of claim 1, wherein each predetermined radius of said prohibited, correction and alarm zones is a constant radius defining a respective cylindrically shaped zone.

13. The method of claim 11, wherein each predetermined radius of said prohibited, correction and alarm zones is a constant radius defining a respective cylindrically shaped zone.

* * * * *